United States Patent [19]
Swanson

[11] 3,850,029
[45] Nov. 26, 1974

[54] APPARATUS FOR MEASURING THE COMPRESSIBILITY OF CIGARETTES AND THE LIKE

[75] Inventor: S. Keith Swanson, Saratoga, Calif.

[73] Assignee: Measurex Corporation, Cupertino, Calif.

[22] Filed: July 16, 1973

[21] Appl. No.: 379,761

[52] U.S. Cl. .................................. 73/81, 73/94
[51] Int. Cl. ............................................ G01n 3/42
[58] Field of Search .................................. 73/94, 81

[56] References Cited
UNITED STATES PATENTS
3,572,101  3/1971  Moore .................................. 73/81

*Primary Examiner*—James J. Gill
*Attorney, Agent, or Firm*—Flehr, Hohbach, Test, Albritton & Herbert

[57] ABSTRACT

Apparatus for measuring the compressibility or firmness of a cigarette rod includes two pairs of contacts for slidably gripping the cigarette rod to be manufactured which are mounted on the ends of levers which themselves are asymetrically mounted on rubber diaphragms which include at least a single corrugation. Each diaphragm closes an opening in an air chamber which is supplied a constant pressure to thus provide a constant force on each of the lever arms. The asymetrical mounting of the lever arms produces a differential force between the contact pairs, the differential force producing a differential compression or displacement of the cigarette rod such differential displacement being a measure of the compressibility of the rod. The differential displacement is actually detected by measuring the change in the reluctance of the flux path between the contacts caused by a change in the distance between the contacts.

5 Claims, 5 Drawing Figures

APPARATUS FOR MEASURING THE COMPRESSIBILITY OF CIGARETTES AND THE LIKE

BACKGROUND OF THE INVENTION

This invention relates generally to apparatus for measuring the compressibility of a moving rod-shaped object and more particularly to apparatus for measuring the firmness of cigarettes while being manufactured.

In the manufacture of cigarettes it is desirable that each finished cigarette have a finished firmness near an optimum value. Since all cigarettes being manufactured at any one time are of essentially the same diameter, a variation in the amount of tobacco contained in each finished cigarette may also effect the firmness or compressibility of the cigarette.

In U.S. Pat. No. 1,864,728 issued June 28, 1932, to W. J. Hawkins et al. a device was proposed for automatically controlling the quantity of tobacco fed to a cigarette rod forming unit by using a mechanical feeler to sense the firmness as it was being produced. Such feeler would then feed back information to the tobacco feed controller.

Devices such as the foregoing were criticized in U.S. Pat. reissue No. 25,475 issued Nov. 12, 1963, which states that such mechanical gauging controls did not have the "consistently high accuracy required for satisfactory automatic weight control." In implicit agreement with the foregoing is U.S. Pat. No. 3,411,513 issued Nov. 19, 1968, which discloses a firmness control system that measures depressions in the cigarette rod caused by a jet of air directed against the moving rod.

One major reason for the earlier devices unsatisfactory performance was that they were unable to compensate for axial movement of the entire rod during measurement.

The earlier devices attempted to determine firmness by measuring the radial compression of the rod using the trough through which it traveled as a reference point. However, the rod was moving very fast axially along the trough and would flutter. Consequently a stable reference point could not be maintained and the accuracy of device measurements was very poor.

OBJECT OF SUMMARY OF THE INVENTION

It is, therefore, an object of the present invention tp provide an improved device for measuring the firmness of rodshaped objects such as cigarettes.

In accordance with the above object there is provided apparatus for measuring the compressibility of a moving rod-shaped object where compressibility is defined as $\Delta X/\Delta F$ where $\Delta F$ is the displacement of the object when subjected to the force $\Delta F$. First and second contact pairs are spaced along the line of movement of the object for slidably gripping and displacing the object. Means apply a differential force to the first and second contact pairs. Gauge means are included in the contact pairs for sensing the distance between the contact pairs while slidably gripping and displacing the object in response to the differential force. The distances between the first and second contact pairs are indicated by first and second electric signals, respectively. The difference between such signals is proportional to the compressibility.

DETAILED DESCRIPTION OF THE PREFERRED EMBODIMENT

Figure 1:
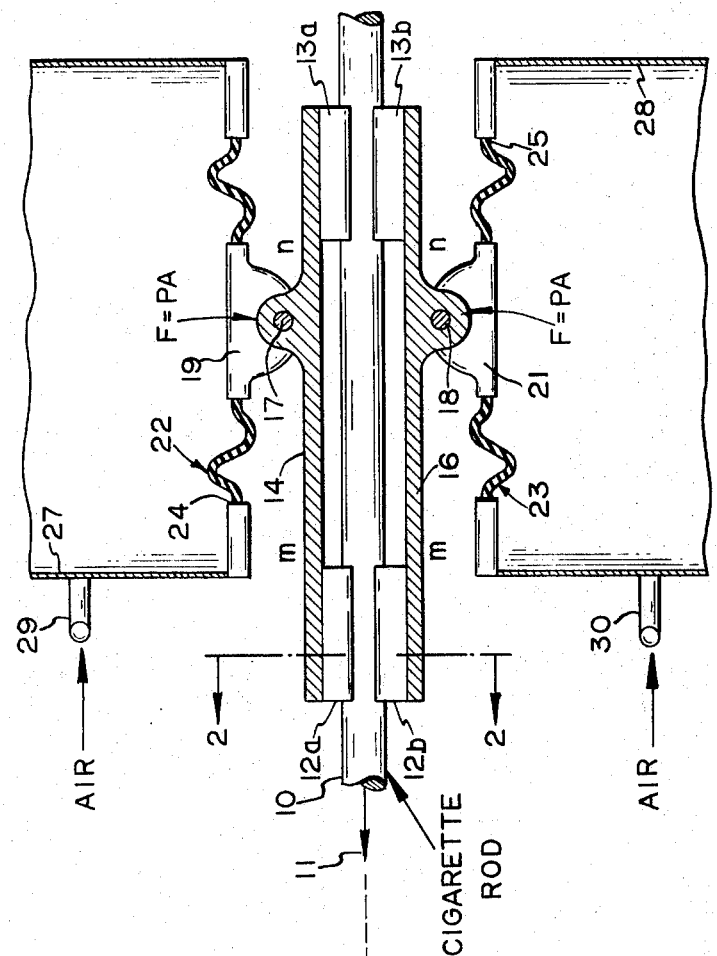
FIG. 1 is a simplified cross-sectional view of apparatus embodying the present invention.
Figure 2:
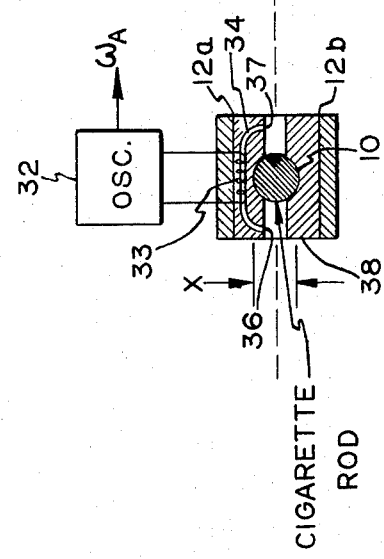
FIG. 2 is a cross-sectional view taken along line 2—2 of FIG. 1.

In FIG. 1 there is illustrated a continuous uncut cigarette rod 10 passing in the direction shown by the arrow 11 through the contact pairs 12a, b and 13 a, b. FIG. 2 illustrates contact pair 12a, b in cross section. The upper contacts 12a and 13a are mounted on a lever 16. Contacts 12a, b and 13a, b slidably grip the continuous cigarette rod 10. Lever 14 is asymetrically pivoted at its pivot point 17 and lever 16 is similarly asymetrically pivoted at pivot point 18 to thus provide the lever arms m and n; specifically in the case of lever 14, lever arm m for contact 12a and n for contact 13a and similarly for lever 16.

Pivot points 17 and 18 are actually coupled to rocker devices 19 and 21 which are respectively affixed to flexible sheet means or rubber diaphragms 22 and 23. These diaphragms enclose the apertures 24 and 25 of the air or gas chambers 27 and 28, respectively. Gas or air supply means (not shown) provide air to chambers 27 and 28 through inlets 29 and 30. The air pressure is substantially constant and has a low value such as one-tenth pound per square inch to provide a constant force at pivot points 17 and 18 as determined by the product of the air pressure and the area of the rocker devices 19 and 21 as illustrated.

The use of rubber diaphragms 22 and 23 both of which include at least one corrugation in a gauge for measuring material is disclosed and claimed in a copending application Ser. No. 246,118 entitled "Apparatus for Measuring A Predetermined Characteristic of Moving Sheet Material Which Accommodates Both Tilting and Changes in Thickness and Vertical Location of the Material," filed Apr. 21, 1972, in the name of Gunnar Wennerberg and assigned to the present assignee. In that application it is disclosed that such rubber diaphragms are also used for pump purposes.

As illustrated in FIG. 2, the distance $X$ between contact pairs 12a and 12b is proportional to the frequency of an oscillator 32 which produces the frequency $\omega_A$. Contact pairs 13a, b produce as will be described later a frequency $\omega_B$. As disclosed in the above-mentioned Wennerberg application, means for gauging the distance $X$ between the contact pairs or in order words, the thickness of the cigarette rod 10 at the contact pairs includes magnetic circuit means mounted on each of the contact pairs for producing a magnetic flux across the gap indicated by the $X$. Since the length of reluctance of the flux path is modified in accordance with the displacement or squeezing of the rod 10 this will modify the inductance of the inductor 33 associated with oscillator 32 to change the resonant frequency $\omega_A$ of the oscillator. Such inductance 33 is shown wrapped around a ferrite rod 34 having ends 36 and 37. The lower contact 12b of the contact pair is composed of ferrite material at 38 which completes the flux path. Oscillator 32 would be a typical inductor-capacitor oscillator. All of the foregoing is described in greater detail in the above-mentioned Wennerberg application.

Although the preferred embodiment shows a rubber diaphragm supplying force to pivot points 17 and 18, a mechanical member or like device could be used instead.

Figure 3:
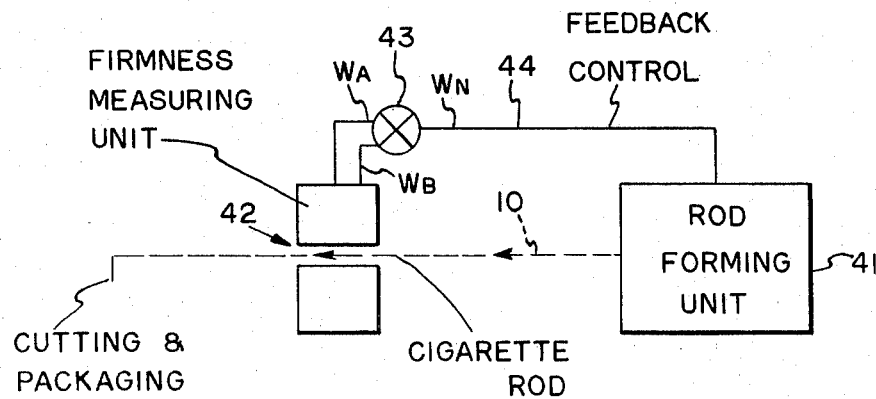
FIG. 3 is a block diagram of a control system embodying the present invention.

FIG. 3 illustrates a block diagram showing how the system of the present invention functions. A cigarette rod forming unit 41 produces the cigarette rod 10 which passes through the firmness measuring unit 42 shown in FIG. 1 also. After passing through the firmness measuring unit the continuous cigarette rod is cut and packaged. Firmness measuring unit 42 senses firmness or compressibility of the cigarette rod at predetermined intervals and produces the electric signals $\omega_A$ and $\omega_B$ which are related to the distance between the contact pairs. However, because of the asymetrical mounting of the contact pairs as illustrated in FIG. 1 unequal or differential forces are applied to the contact pairs so that one contact pair has a greater force than the other and thus the frequencies $\omega_A$ and $\omega_B$ will be different. This difference will be sensed by the mixer unit 43 to provide on line 44 labeled "feedback control" a difference frequency $\omega_N$ which is coupled to rod forming unit 41 to complete the control loop. From a control standpoint if the firmness of the cigarette is too great, less tobacco will be placed in a given length of cigarette rod and vice versa.

Figure 4:
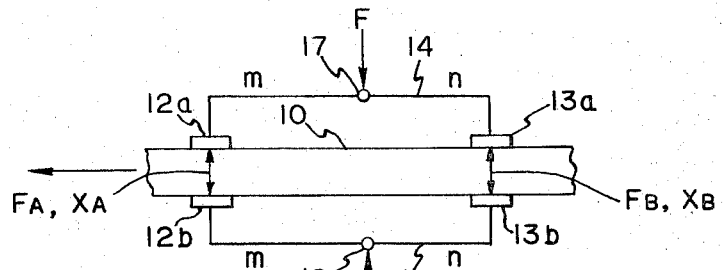
FIG. 4 is a schematic representation of FIG. 1 useful in understanding the invention.
Figure 5:
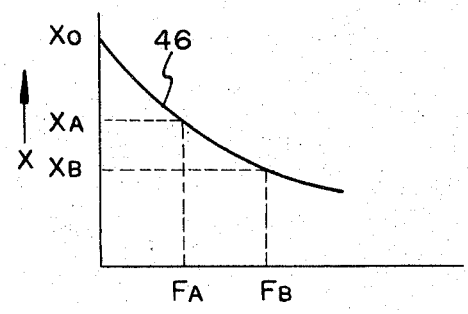
FIG. 5 is a characteristic curve useful in understanding the invention.

FIG. 4 is a schematic representation of FIG. 1. Pivot points 17 and 18 are shown along with the respective levers 14 and 16 and the contact pairs 12a and b and 13a and b. The cigarette rod 10 is shown in passing through the contact pair at the left portion of the rod having a force $F_A$ producing a gap or distance between the contact pairs of $X_A$ and the right portion of the rod 10 having a force $F_B$ producing a gap between the contact pairs $X_B$. Because of the greater force on the contact pairs 13a, 13b due to the shorter level arm the rod 10 is displaced the greater distance as illustrated in FIG. 5. As also illustrated the compressibility of the cigarette rod is assumed to be a nonlinear function as illustrated by the curve.

By the use of the differential displacement $X_A - X_B$ produced by the differential forces, $F_B - F_A$, variations in measurement due to diameter and shape changes of the cigarette rod which may occur in the manufacturing processes are eliminated. Thus, the present invention eliminates the defects of mechanical sensing devices of the prior art. From a theoretical standpoint, the compressibility or firmness of a cigarette rod may be defined by $$C = \Delta X/\Delta F = X_A - X_B/F_B - F_A \quad (1)$$

where $\Delta X$ is the displacement of the rod shaped object such as a cigarette rod when subjected to the force $\Delta F$.

Referring to FIG. 4, the forces applied at pivot points 17 and 18, $F$, are also equal to $$F = F_A + F_B \quad (2)$$

Since the force or vector system shown in FIG. 4 must be by definition a stable system, the following applies.

$$F(m) = F_B (m+n) \quad (3)$$

Solving (3) yields $$F_B = F(m)/m + n \quad (4)$$

Rearranging (2)

$$\Delta F = F_B - F_A = -F + 2F_B \quad (5)$$

Substituting equation (4) in equation (5)

$$\Delta F = -F + 2F(m)/m + n = F(-1 + 2m/m + n) \quad (6)$$

Combining (1) and (6)

$$C = X_A - X_B/\Delta_F = X_A - X_B/-F(1 - 2m/m + n) \quad (7)$$

Since the distances $X_A$ and $X_B$ are directly proportional to the frequencies $\omega_A$ and $\omega_B$ $$X_A - X_B = \omega_A - \omega_B = \omega_N \quad (8)$$

Substituting equation (8) in equation (7)

$$C = \omega_N/K$$

where $K = -F(1 - 2m/m + n)$.

Thus, the compressibility of a cigarette rod is directly proportional to the difference frequency produced by an oscillator associated with the respective contact pairs 12a, b and 13a, b. Such frequency $\omega_N$ may then be used in the control feedback control loop to adjust, as illustrated in FIG. 3, the rod forming unit 41. To compensate for dense ends the sum of the lever arms m and n should equal one cigarette length.

From the foregoing discussion, it is clear that the present invention overcomes the flutter problem by differentially measuring the force and displacements necessary to determine firmness. Thus, the present invention has provided an improved device for measuring the firmness or compressibility of rod-shaped objects such as cigarettes.

I claim:

1. Apparatus for measuring the compressibility of a continuously moving uncut rod-shaped object where compressibility is defined as $\Delta X/\Delta F$ where $\Delta X$ is the displacement of said object when subjected to the force, $\Delta F$, said apparatus comprising: first and second contact pairs spaced along the line of movement of said object for slidably gripping and compressing said object; means for applying a different known forces to said first and second contact pairs tending to compress said object in two places said means including pivotal mounting means for said contact pairs disposed on opposed sides of said rod-shaped object; gauge means included in said contact pairs, for sensing the distances between the contacts of each pair while said contacts slidably grip and compress said object in response to said force applying means; means for indicating the distance between the contacts of each pair by first and second electric signals respectively; and means for finding the difference between such signals, such difference being proportional to said compressibility.

2. Apparatus as in claim 1 where said differential means includes a pair of juxtaposed levers carrying said first and second contact pairs at the two ends of the levers and including means for asymetrically pivoting said levers to provide said differential force.

3. Apparatus as in claim 2 where said means for asymetrically pivoting said levers include a gas chamber having an aperture each and flexible sheet means having at least one corrugation closing said aperture one of said levers being mounted at an asymetrical pivot point on said sheet means, and gas supply means for providing a substantially constant pressure in said chamber to produce a constant force on said pivot point.

4. Apparatus as in claim 1 where said gauge means include magnetic circuit means mounted on each of said contact pairs for producing a magnetic flux across said distance between said contact pairs whereby the length of the flux path is modified in accordance with said displacement of said object.

5. Apparatus for measuring the firmness of a continuously moving uncut rod where compressibility is defined as the indentation in said rod resulting from a particular applied force, said apparatus comprising: means for continuously applying a first known force to said continuously moving rod at a first point such that said rod is radially compressed a first distance; means for measuring said first distance; means for continuously applying a second known force to said continuously moving rod at a second point such that said rod is radially compressed a second distance; second force; means for measuring said second distance; means; means for determining the difference between said first and second distances; to provide an output proportional to compressibility.

* * * * *